358-84. OR 3,601,528 SR

[11] 3,601,528

[72] Inventor David S. McVoy Gainesville, Fla.

[21] Appl. No. 833,519
[22] Filed June 16, 1969
[45] Patented Aug. 24, 1971
[73] Assignee Coaxial Scientific Corporation

[54] TELEVISION COMMUNICATIONS SYSTEM WITH CODING AND DECODING
10 Claims, 3 Drawing Figs.

[52] U.S. Cl. .......... 178/5.1
[51] Int. Cl. .......... H04n 1/32, H04n 1/34, H04n 1/44
[50] Field of Search .......... 178/5.1, 5.1 CS

[56] References Cited

UNITED STATES PATENTS

| | | | |
|---|---|---|---|
| 2,567,539 | 9/1951 | Aram | 178/5.1 |
| 2,612,552 | 9/1952 | Crotty et al. | 178/5.1 |
| 2,864,885 | 12/1958 | Morris | 178/5.1 CS |
| 3,001,011 | 9/1961 | Weiss et al. | 178/5.1 |
| 3,211,830 | 10/1965 | Sargent, Jr. | 178/5.1 CS |

*Primary Examiner*—Rodney D. Bennett, Jr.
*Assistant Examiner*—Malcolm F. Hubler
*Attorney*—Spector and Alster

ABSTRACT: A subscription television system comprises a transmitter unit that codes or scrambles its composite output signals comprising video intelligence signals and synchronizing pulses by separating the video signals from the synchronizing pulses and transmitting them over separate carriers to a decoding receiver. The synchronizing pulse carrier is transmitted to the receiver over a cable while the video carrier may be transmitted over-the-air or over the cable. The receiver passes the scrambled video to the subscriber's television set. Circuitry is provided, however, for selectively passing the synchronizing pulse carrier through the receiver and forming the decoded or unscrambled original composite signal, and at the same time activating a recorder to measure the amount of viewing time.

INVENTOR
DAVID S. McVOY by: Spector & Alster
ATTYS.

INVENTOR
DAVID S. McVOY
by: Spector & Alster
ATTYS.

TELEVISION COMMUNICATIONS SYSTEM WITH CODING AND DECODING

This invention relates to subscription or pay television communications systems.

In conventional subscription television systems, the signals are scrambled at the transmitter, and then unscrambled by suitable equipment, usually attached or adjacent to the subscriber's set. The scrambling and unscrambling equipment is comparatively intricate and high in cost. Nevertheless, it is possible for others to build an unscrambling device that could be supplied to set owners and thus subvert the system. Moreover, as technical standards for television broadcast change, existing scrambling and unscrambling equipment becomes obsolete and must be replaced or modified, thus further increasing the costs to the operator of the pay television system. Finally, in order to record the number of hours of subscription television viewed by the subscriber, the unscrambling equipment contains a meter which must usually be read from inside of the subscriber's home.

It is an object of this invention to provide a coding and decoding system in which the transmitted information is coded or scrambled by transmitting the video signals (including audio) and the synchronizing signals (i.e. composite vertical and horizontal synchronizing information) over different carriers and in which a decoding receiver portion of the system has suitable circuitry by which the subscriber may, at his option, produce a decoded signal for transmission as an input to his television set when he desires to view an unscrambled picture on the channel over which the pay television information is being transmitted. Such decoded signal will comprise the video carrier of the pay television channel modulated by the video signals and the composite synchronizing pulses therefore.

It is a further object of this invention to provide a system of the type stated in which the receiver comprises a "home" unit, preferably at the subscriber's set, and a remote or street unit connected to the cable and also connected to the home unit through a service drop. The remote unit contains a recorder for indicating the time during which the pay television is being viewed. The remote unit is preferably in a location not readily accessible to the subscriber, but nevertheless, the system provides an arrangement by which a pay TV on-off switch at the home unit can be operated to allow the sync signal to pass through the remote unit to the home unit for producing the decoded signal therein, and at the same time activate the recorder.

It is a further object of this invention to provide a system of the type stated which is compatible with color-casting and with cable transmission or "over-the-air" transmission of the video signals.

It is another object of this invention to provide a system of the type stated in which it is not necessary to enter the subscriber's home in order to obtain the necessary billing information from the recorder or counter.

It is also an object of this invention to provide a system of the type stated in which it is impossible to utilize a bogus unscrambler without access to the sync pulses, which are available only from the cable of the system.

In a preferred form of the invention for use in a cable television, a transmitter unit comprises a signal source, such as a video tape recorder, which sends out a composite signal comprising the video information (e.g. picture and sound) and the composite sync pulses. The composite signal is sent to a sync separator and thereafter the video signals are used to modulate a video carrier at the pay TV frequency. The separated sync pulses are used to modulate a subcarrier. Simultaneously with the transmission of the aforesaid composite signal, the transmitter unit also sends out billing tone signals which modulate another subcarrier. The modulated carriers for the video signals, the sync pulses and the billing tones are transmitted over the main coaxial cable of the system to a decoding receiver for each subscriber. The receiver taps off the three carriers from the main cable and passes the video carrier through the remote or street unit portion of the receiver and the home unit portion of the receiver and to the subscriber's set. The sync pulse carrier passes through a circuit in the receiver which includes a high-frequency switch in the remote unit that is remotely controlled by the subscriber from the home unit. When the high-frequency switch is closed, the sync pulse carrier is allowed to pass through the receiver and into the home unit where by suitable circuitry a carrier at the subscription television frequency, modulated by the video and sync pulses, is sent to the subscriber's set. Also, when the high-frequency switch is closed, a counter is activated and responds to the billing tones to record the viewing time. Likewise, opening the high-frequnecy switch deactivates the counter and at the same time blocks the passage of the sync pulse carrier so that the subscriber then receives only a scrambled video signal.

Figure 1:
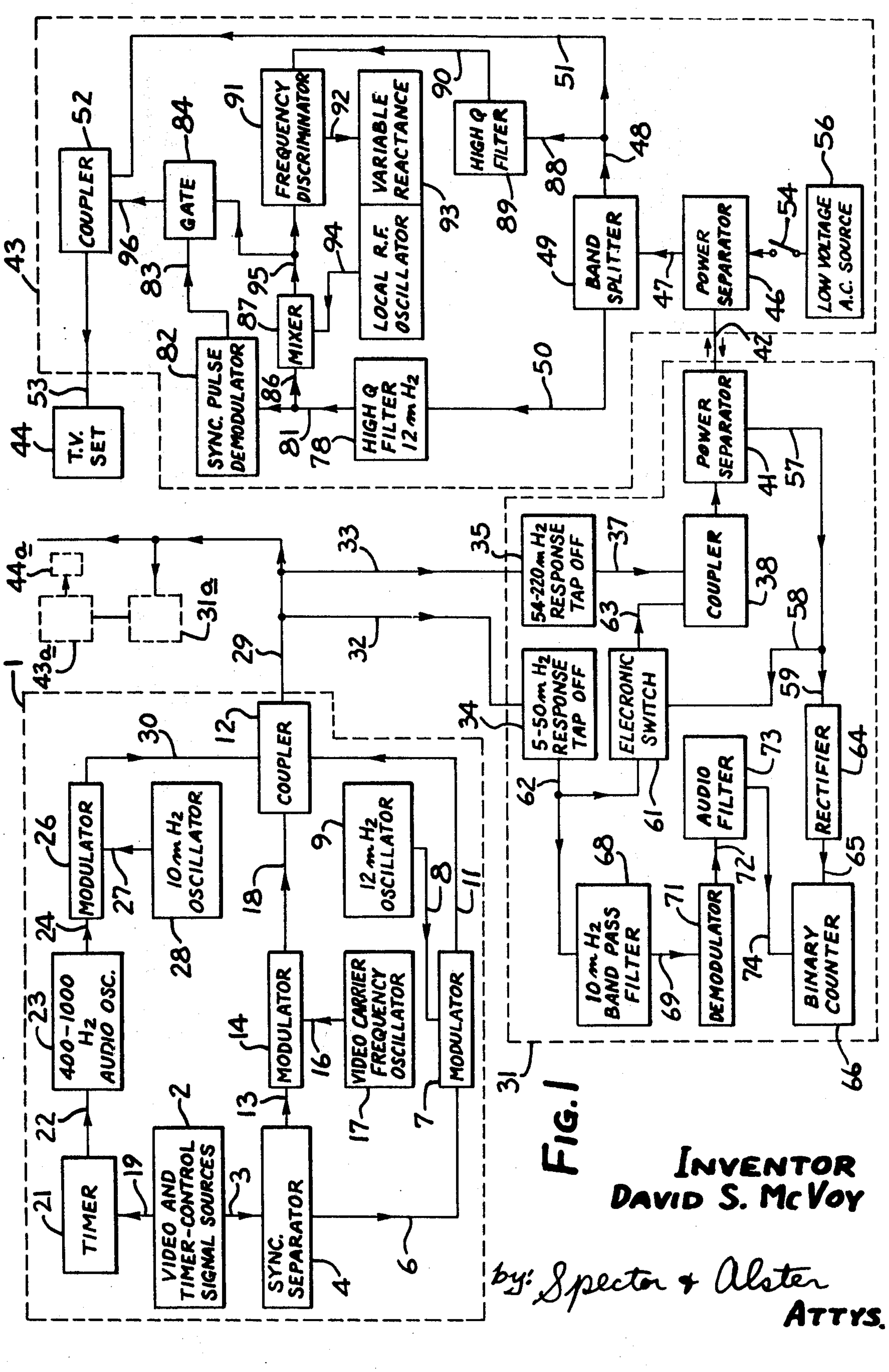
FIG. 1 is a block diagram of the invention in a form in which it may be used with a cable television system.

Referring now to FIG. 1, there is shown a system comprising a transmitter unit 1 having a suitable signal source 2, which may be a video tape recorder. An output signal from the signal source 2 on conductor 3 comprising a composite signal that includes the video signals (including the audio) and the vertical and horizontal sync pulses. This composite signal on the conductor 3 goes to a sync separator 4 where the composite sync pulses are separated from the remainder of the signal. The sync pulses are sent out from the sync separator 4 over a conductor 6 to a modulator 7 where the sync signals modulate the output on conductor 8 from a local oscillator 9 having a frequency that is relatively low as compared to the VHF television band, say about 12.0 mHz. The modulated sync pulses then are transmitted over conductor 11 to a band combiner or coupler 12. The video signals are sent out from the sync. separator 4 over conductor 13 to a modulator 14 where they are used to modulate the output signals on conductor 16 from a video carrier frequency oscillator 17. The frequency of the oscillator 17 is that frequency or channel at which the subscription television is being transmitted. The modulated video carrier is then transmitted over a conductor 18 to the coupler 12.

Simultaneously with the transmission of the video and synchronizing signals from the signal source 2, there is transmitted therefrom over conductor 19 a signal that activates a timer 21. Activation of the timer 21 results in a signal being sent therefrom over conductor 22 to turn on an audio oscillator 23 having a frequency in the 400–1,000 Hz. range. The audio output over conductor 24 is sent to a modulator 26 that modulates the signal on conductor 27 from a local oscillator 28 having a frequency of 10.0 mHz. The output of the audio modulated signal from the modulator 26 is sent over conductor 30 to the coupler 12.

The timer 21 turns the audio oscillator 23 on and off for a specified number of times per minute to produce a series of tone bursts, for example corresponding to the amount for which a subscriber is to be billed for the program being transmitted, assuming the subscriber is receiving the same in decoded form. Thus, if a tone burst from the oscillator 23 is valued, say, at 5 cents, and the cost of the program is 1 dollar, then 20 audio bursts would be sent out from the oscillator 23 during that program. The information signal on conductor 19 may come from an additional audio track on the tape recorder forming part of the signal source 2 and may be used to program the timer 21. The timer 21 may, of course, be manually programmed and the signal on conductor 19 used simply to turn the timer on and off.

The billing tone signal on conductor 30, the modulated video carrier on conductor 18 and the modulated sync pulse carrier on conductor 11 are combined in the coupler 12 and transmitted through the coaxial cable 29 of the CATV system to the various subscribers.

At the street or other location of the cable 29 adjacent to the subscriber's premises is a remote or street unit 31 that forms part of the decoding receiver of the system. This unit includes conductors 32, 33 which form part of cable tapoffs 34, 35, respectively, the tapoff 34 having a frequency response of 5–50 mHz and the tapoff 35 having a frequency response of 54–220 mHz. The tapoff 35 will, therefore, pass the VHF television band in which will be included the subscription frequency generated by the oscillator 17.

The output from the tapoff 35 is sent over conductor 37 to a combiner or coupler 38 and from there over conductor 39 to a power separator 41. The output from the power separator 41 is sent over a service drop cable to a home unit 43, preferably in the subscriber's premises adjacent to his television receiver 44. The input to the unit 43 is to a power separator 46 therein, and the output of the power separator 46 is over conductor 47 to a band splitter 49. The band splitter operates to send signals over conductor 48 in the 50–220 mHz. band and those signals pass over conductor 51 to a combiner or coupler 52. From the coupler 52 the signal is sent over the output circuit 53 of the receiver to the subscriber's television set 44. Signals in the 10–50 mHz. band are sent from the band splitter 49 over conductor 50, for purposes presently more fully appearing. Thus, the subscriber will, under the circumstances just described obtain ordinary reception in the VHF band, except at the subscription frequency, and at that frequency the audio will be received in a normal manner, but the video portion will be scrambled due to the absence of the sync pulses. Also, if the subscription transmission is in color, no color will be received since the color burst signal, which normally is on the back porch of the horizontal blanking pulse, is not under these circumstances transmitted to the television set 44.

The home unit 43 also includes a normally open subscriber TV selector switch 54. So long as the switch 54 is open, the scrambled video is received by the set 44, as just described. However, if switch 54 is closed, power is supplied from a low-voltage source 56 over the house drop cable 42 via the power separators 46 41 to conductor 57 and to conductors 58, 59. A voltage on conductor 58 serves as a control and closes a normally open electronic switch 61. This allows the modulated 12.0 mHz. synchronizing pulse carrier to pass from the conductor 62 through the switch 61, then over conductor 63 to coupler 38, through power separator 41, house drop cable 42, power separator 46 and to the conductor 47. At the same time, the voltage on conductor 59 will be applied to a rectifier 64 and the DC output thereof on conductor 65 will activate a recorder or counter 66 for counting by the billing tone bursts.

The 10.0 mHz. billing tone carrier on conductor 62 will pass through the filter 68 and over conductor 69 to a demodulator 71 and the demodulated audio output will be fed over conductor 72 to an audio filter 73 having a band width just sufficient to pass the demodulated audio tones. The audio tone bursts are continuously applied on conductor 74 to the counter 66, but unless the counter 66 has been turned on as a result of closing of the switch 54 and consequent operation of the rectifier 64, the counter 66 will not operate. But if the counter is in operation, it will count the number of tone bursts received.

Again, assuming that the switch 54 is closed, the12.0 mHz. modulated sync pulse carrier passes from conductor 47 to the band splitter 49 and over conductor 50 to a high Q 12.0 mHz. filter 78. The output from the filter 78 is on conductor 81 and is sent to a sync pulse demodulator 82, and the demodulated synchronizing pulses pass over conductor 83 to a gate 84. The 12.0 mHz. modulated sync pulse carrier also passes over conductor 86 to a mixer 87.

The modulated video carrier also passes from conductor 48 to conductor 88 and through a high Q filter 89 that is tuned to the frequency of the subscription television channel. The output from the filter 89 on conductor 90 goes to the mixer 87 through an automatic frequency control circuit. Such arrangement comprises a frequency discriminator 91, such as a ratio detector, the output of which is a correction voltage that is sent over conductor 92 to a variable reactance-local oscillator circuit 93. Conventionally, the variable reactance includes a tube that appears as a variable reactance across the oscillator tank circuit. The oscillator of the circuit 93 is tuned to a frequency which is equal to the subscription television frequency less 12.0 mHz., the carrier frequency of sync pulses. The output of the oscillator of the circuit 93 is fed over conductor 94 to the mixer 87 where it is heterodyned with the modulated sync pulse carrier from conductor 86 to produce an upper sideband frequency on the mixer output conductor 95 that is equal to the subscription carrier frequency. Part of the output on conductor 95 is also fed back to the frequency discriminator 91 as part of the automatic frequency control circuit. If desired, provision may be made for tuning the filter 89 with the oscillator of circuit 93 to change the to-be-received subscription channel, as determined by the frequency of the oscillator 17.

The sync pulse modulated carrier at the subscription television frequency is sent on conductor 95 to the gate 84. However, the signals on conductor 83, consisting of the composite vertical and horizontal sync pulses, are also applied to the gate 84 as a trigger to open and close the gate 84. Gate 84 is opened only during the vertical and horizontal sync time segments, and this results in connecting the signals on conductor 95 to the coupler 52 for only those time segments represented by the vertical and horizontal sync pulses. Consequently, the sync pulses are properly reapplied in the coupler 52 to the video carrier signal sent thereto over the conductor 51 to reproduce the original intelligence sent out over the conductor 3, which is now modulating the subscription television carrier. The resultant decoded signal is sent over conductor 53 to the subscriber's television set 44.

From the foregoing it will be seen that the sync pulses can pass through the electronic switch 61 and ultimately be reapplied to the modulated video signals only when the subscription switch 54 is closed. The electronic switch 61 is located at the cable TV pedestal or in some other position generally inaccessible to the subscriber, thereby effectively preventing a defeat of the system. The counter 66 may also be housed in the cable pedestal so that it may be read without access to the subscriber's home. Furthermore, if color is being transmitted, the color burst is properly reproduced when the sync pulses are passed through the decoding receiver.

For each subscriber along the cable 29, there will be a remote unit 31*a* and a home unit 43*a*, like the ones previously described, for use with the subscriber's television set or sets 44*a*.

Figures 2, 3:
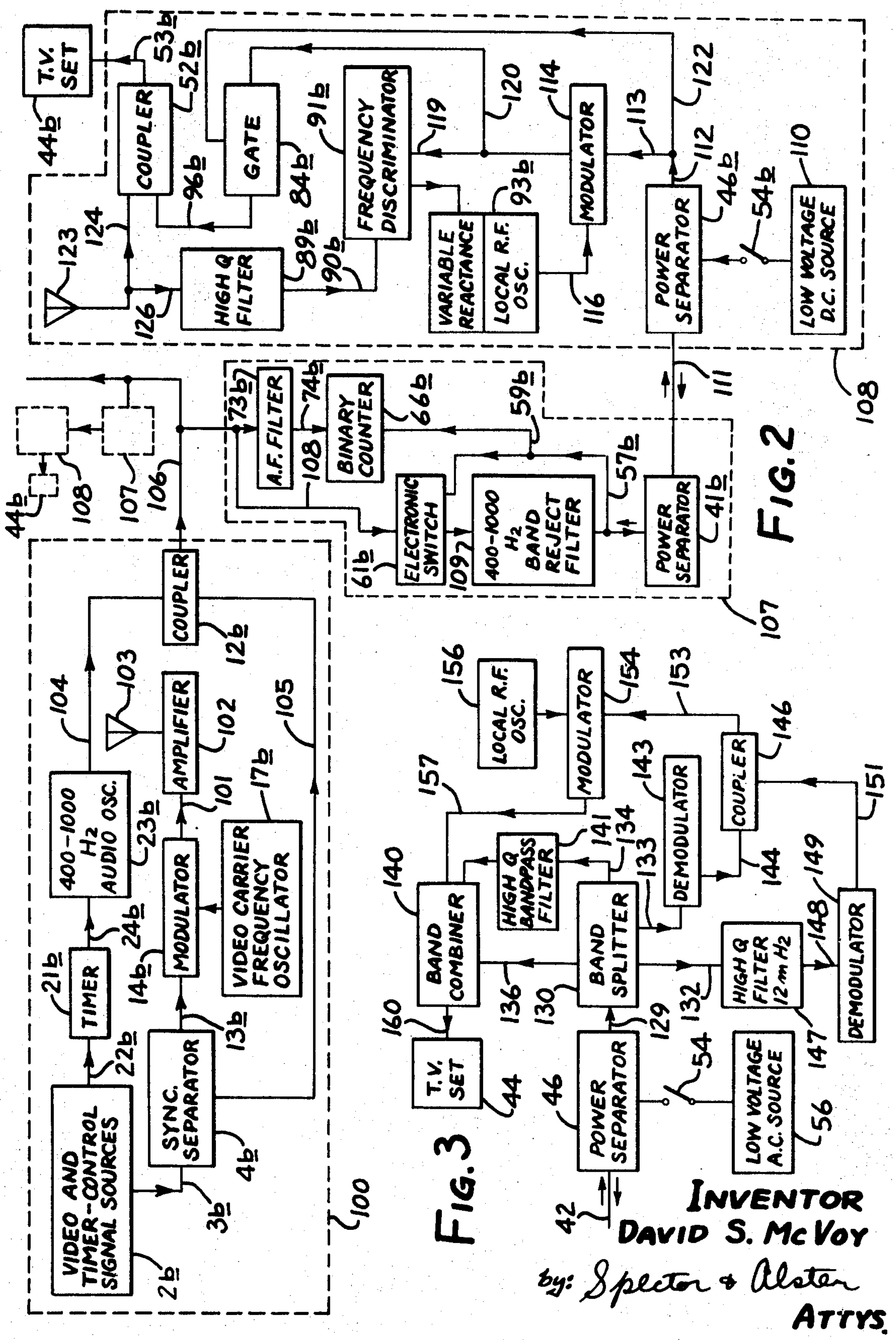
FIG. 2 is a block diagram of a modified form of the invention for "over-the-air" transmission of the video signals.
FIG. 3 is a block diagram of a modified form of home unit.

In FIG. 2 there is shown a modified form of the invention for use in over-the-air transmission of the video. The parts indicated by numerals followed by the subscript *b* are the same as the corresponding parts of FIG. 1. However, in the transmitter unit 100 of FIG. 2, the video (including audio) signals, modulating a carrier of the subscription frequency, are sent from the modulator 14*b* over conductor 101 to a transmitting amplifier 102 and then to a transmitting antenna 103. The audio billing tone signals are sent out over conductor 104 and the sync signals are sent out over conductor 105 to the coupler 12*a*, and from there over a telephone line 106 to the street units 107 of the various subscribers. The phone line 106 may have a frequency response of about 60 to about 15,000 Hz., which is sufficient for passage of the sync pulses and the audio billing tones.

From the line 106, the billing signals pass through the audio frequency filter 73*b* that passes the frequency of the billing signals and sends those signals to the counter 66*b*. The sync pulses pass from the line 106 and over conductor 108 and are sent through the electronic switch 61*b* when the on-off switch 54*b* on the home unit 108 is closed to supply actuating DC voltage from source 110 to the switch 61*B*. That DC voltage is also applied over conductor 59*b* to the counter 66*b* to activate the same. A band reject filter 109 filters out the audio billing tones but allows the higher frequency sync pulses to pass therethrough and to the power separator 41*B*.

The sync pulses are sent from power separator 41*b* over telephone house drop or service conductor 111 to the power separator 46*b* and from there over conductors 112, 113 to a modulator 114 where they modulate the signals on conductor 116, which constitutes the output of the variable reactance controlled oscillator 93*b*. The oscillator 93*b* is, however, tuned to the subscription television channel, with the result that the output of the modulator is the subscription frequency modulated by the synchronizing information. A portion of the output of the modulator 114 is sent over conductor 119 to the frequency discriminator 91*b*. Another portion of the output of the modulator 114 goes on conductor 120 to a gate 84*b*. For triggering the gate 84*b* only during the horizontal and vertical synchronizing time segments, the synchronizing pulses are sent over conductor 122 to said gate 84*b*.

The scrambled modulated subscription video carrier is received over an antenna 123 and passes over conductor 124 through combiner or coupler 52*b* to the output conductor 53*b* for transmission to the TV set 44*b*. The gated sync pulse carrier will apply the sync pulses to the incoming video carrier to provide an unscrambled picture, as described with reference to FIG. 1, when the switch 54*b* is closed. If switch 54*b* is open, the video signals through the coupler 52*b* are scrambled. A portion of the signal on conductor 124 is sent over conductor 126 to the filter 89*b*, and the output of the filter on conductor 90*b* is sent to the frequency discriminator 91*b* where it is compared with the signal on conductor 119 to provide the A.F.C., as previously described.

FIG. 3 shows a modified form of home unit which may, mHz. instance, sync used in lieu of the home unit 43. The modulated sync pulse carrier and the modulated video carrier received over the house drop cable 42 pass through the power separator 46 and over conductor 129 to mHz. band splitter 130. The output of the band splitter 130 comprises the 12 mHz modulated sync. pulse carrier on conductor 132, the subscription modulated video carrier (less audio subchannel) on conductor 133, the audio channel on conductor 134, and on conductor 136, signals in the 54–216 mHz band less the subscription channel.

The signal on conductors 136, 134 go to the band combiner 140, the signal on conductor 134 first passing through filter 141 so that only the narrow audio carrier reaches the band combiner 140. Television channels on conductor 136 other than the subscription channel are passed through the band combiner 140 for normal reception by the set 44.

The subscription video frequency on conductor 133 goes to demodulator 143 and the demodulated video output on conductor 144 goes to a coupler 146. Likewise, the signal on conductor 132 passes through a filter 147 that passes the modulated sync pulse carrier, which is sent over conductor 148 to demodulator 149. The demodulated sync pulses are sent over conductor 151 to the coupler 146 where they are combined with the video signals to produce a composite decoded video and sync signal on conductor 153 representative of the original signal generated by the signal source 2 (FIG. 1).

This signal on conductor 153 is sent to a modulator 154 where it is used to modulate a signal delivered thereto by a self-regulating oscillator 156, which is tuned to the subscription television carrier or channel. This modulated carrier is then transmitted over conductor 157 to the band combiner 140 where it is combined with the subscription audio carrier sent from the filter 141 and then transmitted over conductor 160 to the set 44.

The precise constructions herein shown are merely illustrative of the principles of the invention. What is considered new and sought to be secured by Letters Patent is:

1. In a communications system, means for emitting signals which comprise a composite of video signals and synchronizing pulses therefore, means for separating the synchronizing pulses from the video signals, means for modulating a carrier by said video signals, means for modulating another carrier by said synchronizing signals, means for transmitting said modulated carriers; in combination with means for receiving said carriers, said receiving means having an output circuit, a circuit for passing said modulated video carrier through the receiving means and to said output circuit, and circuit means for effecting at said output circuit said video carrier modulated by the composite of said video signals and said synchronizing pulses; and selector means for optionally preventing the synchronizing pulses from passing to said output circuit.

2. A system according to claim 1 in which said last-mentioned means comprises part of said receiving means and includes a switch for selectively making and breaking a transmission circuit for the modulated synchronizing pulse carrier.

3. A system according to claim 1 further having means including a recorder for making a recorded indication responsive to a time interval during which said synchronizing pulses appear on said output circuit, and means controlled by said selector means for determining the operation of said recorder.

4. A system according to claim 3 in which said circuit means comprises a first branch circuit having means for demodulating said synchronizing pulse carrier, a local oscillator, a second branch circuit having a mixer for heterodyning the modulated synchronizing pulse carrier with the output of said local oscillator to produce a modulated synchronizing pulse carrier that has a frequency equal to that of said video carrier, said second branch circuit having a gate for passage of said last-mentioned modulated carrier, said gate being triggered in response to said demodulated synchronizing pulses from said first branch circuit.

5. A system according to claim 3 in which said circuit means comprises means for demodulating the synchronizing pulse carrier, means for demodulating the video carrier, means for mixing the demodulated video signals and synchronizing pulses, and means for modulating a signal at the frequency of said video carrier by the composite video signals and synchronizing pulses.

6. In a television system, means for encoding a television signal by separately transmitting video signals and synchronizing signals therefore, in combination with means for receiving said signals, said receiving means including an output circuit, a circuit for passing said video through said receiving means and to said output circuit, circuit means for effecting at said output circuit a decoded composite of said video modulated by said synchronizing signals, and selector means optionally permitting or preventing passage of said synchronizing signals to said output circuit for producing or not producing said decoded composite as determined by the selector means.

7. A system according to claim 6 further having means for making a recorded indication responsive to the time interval during which said synchronizing signals appear at said output circuit, and means controlled by said selector means for effecting the operation of said recorder means when said synchronizing signals are passed to said output circuit and for inhibiting the operation of said recorder means when the synchronizing signals are prevented from appearing at said output circuit.

8. A system according to claim 7 in which said selector means is part of a first unit, said means controlled by said selector means is part of a second unit, and said units are remote from each other and are electrically connected to each other.

9. In a subscription television system, means for encoding a television signal by separately transmitting a first set of signals comprising video signals and a second set of signals comprising synchronizing pulses for the video signals, means for receiving said signals, said receiving means having an output circuit, a circuit for passing one set of signals through the receiving means and to said output circuit, circuit means for passing the other set of signals to said output circuit for effecting at said output circuit a decoded composite containing said video signals modulated by said synchronizing pulses, subscriber-controlled means for optionally determining the passage of said other set of signals to said output circuit and thereby permit or prevent the appearance of said decoded composite at said output circuit, means for generating subscriber-billing signals during the transmission of said two sets of signals, a recorder actuated in response to said subscriber-billing signals when the recorder is activated, and means operable responsive to said subscriber-controlled means for activating said recorder when said other set of signals are passed to said output circuit and for deactivating said recorder when said other set of signals are prevented from appearing at said output circuit.

10. A system according to claim 9 in which said means operable responsible to said subscriber-controlled means is part of a first unit, said subscriber-controlled means includes a switch forming part of a second unit, and said units are remote from each other and are electrically connected to each other.